UNITED STATES PATENT OFFICE.

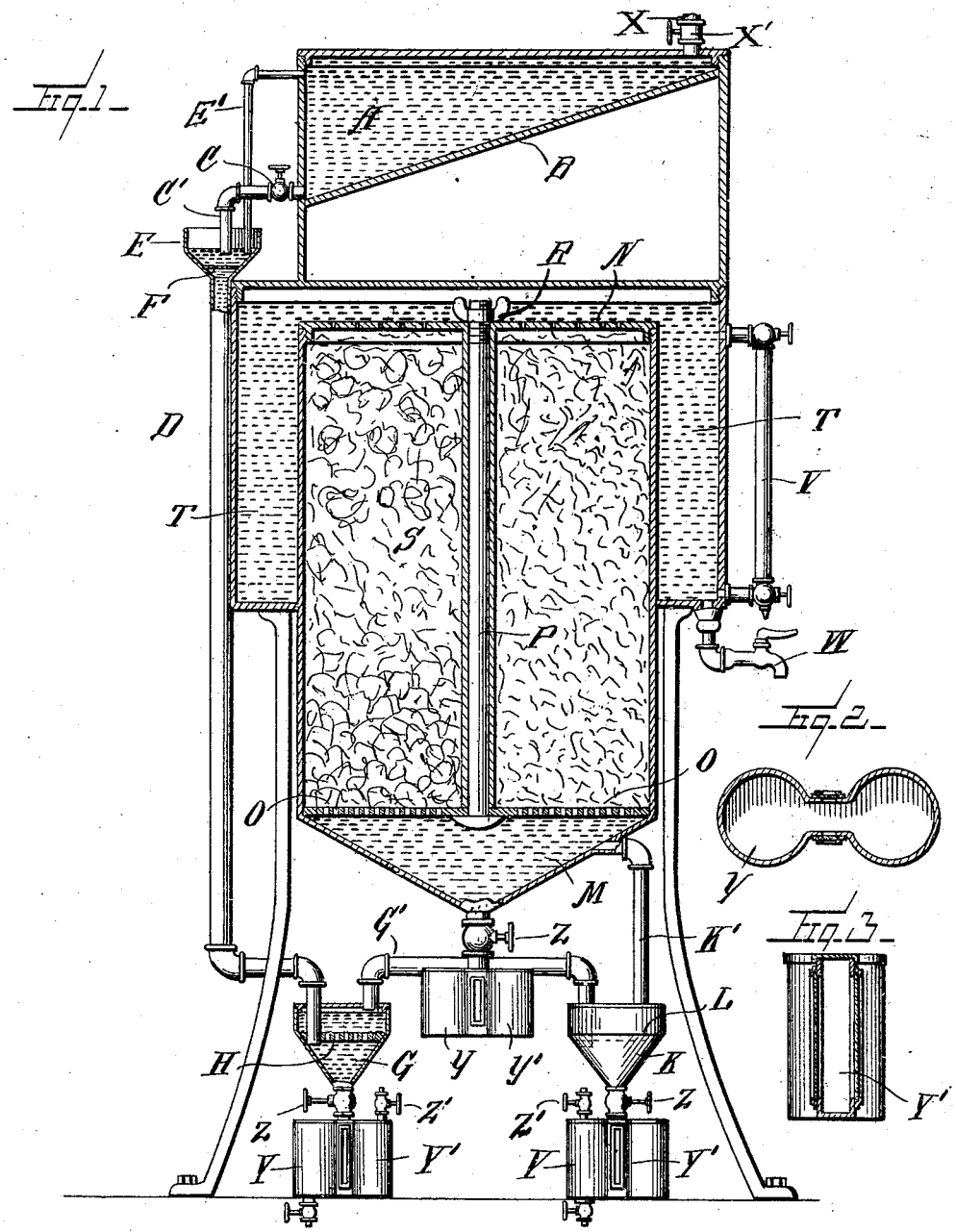

LUCIUS R. CLARK AND DWIGHT G. KREUL, OF DAVENPORT, IOWA.

FILTER.

No. 869,294.     Specification of Letters Patent.     Patented Oct. 29, 1907.

Application filed May 2, 1907. Serial No. 371,506.

*To all whom it may concern:*

Be it known that we, LUCIUS R. CLARK and DWIGHT G. KREUL, citizens of the United States, residing in Davenport, in the county of Scott and State of Iowa, have invented an Improvement in Apparatus for Filtering Oil and other Liquids, of which the following is a specification.

Our improvement relates to certain improvements in oil filters and purifiers; and it consists mainly in an apparatus embodying means for passing impure oil through certain pipes and chambers, whereby dirt, water and all foreign matter may be removed from the oil or other liquid.

A further object is to provide a device of this character which will be simple in construction, reliable and efficient in operation, and well adapted to the purpose for which it is designed.

With these and other objects in view the invention consists of certain novel features of construction, combination and arrangement of parts as will be more fully described, and particularly pointed out in the appended claims.

In the drawings, Figure 1 is a vertical section of the device complete showing the parts in closed position. Fig. 2 is a top plan view of the settling reservoir. Fig. 3 is a detail side view of one of the windows in the settling reservoir, Fig. 4 is another detail view of the same showing a pair of oppositely disposed windows.

Our invention consists in a filter preferably cylindrical in shape, of which A is the chamber for the reception of impure oil or other liquid to be filtered, which chamber is provided with an air tight cover and is filled by the pipe X at the top of said chamber which pipe is provided with the faucet X'. This chamber is provided with an inclined bottom B, an outlet pipe C', an air tube E' whose upper end opens into the top part of the impure oil chamber, and whose lower end is on a level with the lower end of the outlet pipe C'. The pipes C' and E' are introduced within a funnel E, provided with a strainer F which conducts the liquid to be filtered downward through the pipe D and beneath the screen H in the trap G, whence it passes upward through the screen and through the pipe G' to the trap K, where the oil or other liquid is similarly treated and through a sufficient number of other similarly constructed traps and thence through the pipe K' to the side of the conical bottom M, beneath the main filtering chamber S. A perforated disk O is placed within and at the bottom of the chamber S, and is supported by the sides of said chamber, a similarly constructed disk N is connected to the disk O by a rod P passing through the center of each disk, and the space between the disks is filled with suitable filtering material, cotton waste preferred. A thumb screw R threaded upon the upper part of the rod P affords means for giving the requisite compression to the filtering material. The chamber T receives the pure oil or other liquid after it has passed upward through the filtering material, the glass V exhibits the height to which the product of the filtering process rises in the chamber T, and it may be drawn off by the faucet W. Settling basins Y are removably attached to the bottoms of the traps K, and have the form of a cylinder longitudinally compressed in the line of diameter. Glass windows Y' oppositely disposed in the narrowest part of the basin, extend longitudinally from top to bottom thereof.

The operation of the mechanism is as follows: Impure oil is admitted to the chamber A, through the pipe X and when the chamber is filled, the cock X' is closed, after which the faucet C may be left open until such time as the use of the filter is to be discontinued. The impure oil passes through the pipe C' freely as air is admitted into the chamber A, by the pipe E' and when the funnel E is filled to the level of the pipes C' and E', the flow ceases from the chamber as the air pipe E' is closed by the rising oil. The funnel E, which is open to the air will not overflow, and the flow from the chamber A recommences when the level of the oil in the funnel falls below the mouth of the pipe E'. In its downward course, the oil passes through the strainer F in the lower part of the funnel E and through the pipe D to the trap G passing below the strainer H within the trap and delivering the oil below the strainer, whence it passes through the strainer in an upward direction and the coarser impurities and water with which the oil may have been mixed, pass down the trap G and into the settling basin Y, which is rigidly secured to the trap. Provision is made for the removal of the settling basins which may be accomplished by closing the cock Z and opening the pet cock Z' attached to the settling basin. The condition of the sediment in the settling basins may be observed through the oppositely disposed glass windows Y' which are placed at that part of the basin which has been made thinnest by the longitudinal compression of the cylinder employed in their construction. When the basins have been emptied they may be re-attached by threaded connection with the trap or otherwise, the cock Z may be opened, and when the basin is filled with oil, water or sediment, the pet cock Z' may be closed. A sufficient number of traps and settling basins are employed to satisfactorily cleanse the oil of its grosser impurity, when it is conducted upward through the pipe K' to the cone M, at the base of the filtering chamber S. This cone in its lower part is provided with a trap and settling basin, similar in structure to those described. Thus the greater part of all water with which the oil may have been mixed is withdrawn from it before the filtering medium is reached. Even if composed of more water than oil, the device provides a means for constantly eliminating the water, for quickly arriving at oil free from water and for observing the process in every stage, the water settling to the bottom of each of the various receptacles, and there meeting with provision for its withdrawal. Having reached the chamber S, by passing in an upward direction through the perforated disk O, further impurities are removed by suitable filtering material placed between the disks O and N, when the oil arrives in a pure state in the chamber T. Here again, the amount of the pure oil accumulated may be observed through the glass V, and it may be drawn off through the faucet W.

Provision is made for the removal of the top of the filtering chamber S, and all parts may be readily reached for cleaning, necessity for which is reduced to the minimum from the fact that so much impurities and sediments are withdrawn through the settling basins, that the filtering medium in the chamber S becomes clogged only after a long continued usage.

Having thus fully described our invention, what we claim as new and desire to secure by Letters Patent, is—

1. In an oil filter, the combination with an upper receiving tank, of a series of traps below said upper tank, an oil conducting pipe connected to the receiving tank, an air pipe connected to the upper part of the receiving tank having its lower extremity on a level with the oil conducting pipe, a funnel provided with a sieve and open to the air adapted to admit the lower ends of the oil conducting pipe and the air pipe, a vertically disposed tube attached to the funnel, said tube connected to a series of traps, a pipe within each trap connected to the conducting pipe and adapted to convey the material to be filtered below a screen within the trap, settling basins attached to each trap outlet pipes in the upper part of each trap adapted to convey the liquid in process of filtration to the next trap, a main filtering chamber conically formed in its lower part and connected to the last trap, a settling basin attached to the lower part of the filtering chamber, a lower perforated plate or disk supported in the main filtering chamber above its conical base, a filtering medium arranged on said lower plate, an upper plate resting on said medium, a threaded rod connecting said perforated plates a thumb screw attached to the upper end of said rod adapted to engage the said upper plate and compress said filtering material, a chamber above the filtering medium adapted to receive the filtered product, a glass adapted to show the amount of filtered oil in said chamber and a faucet adapted to draw off said product, substantially as described.

2. In a filter of the class specified, an upper receiving tank, a conducting pipe, a series of traps, a settling basin in the form of a cylinder longitudinally compressed in the line of its diameter, oppositely disposed glass windows in the settling basin extending longitudinally from top to bottom thereof, a cover attached to said basin, a pipe attached to the cover and adapted to connect with the first trap at the bottom thereof, similar basins for each additional trap, a main filtering chamber provided with a conical base, a settling basin of the character described attached to the lower part of the conical base removable perforated diaphragms within the filtering chamber an intermediate body of filtering material between the diaphragms, a chamber for the filtered liquid above the diaphragms and means for its withdrawal and means for removal of the top of the filtering chamber.

3. In a filter of the class described, a filtering chamber, preferably cylindrical in shape provided with a removable cover, a conical base attached to the filtering chamber, a conducting tube whose inlet is higher than the filtering chamber, means for supplying the liquid to be filtered to the conducting tube, means for supporting the conducting tube exteriorly to the filtering chamber, traps provided with interior screens serially attached to the conducting tube and located beneath the filtering chamber, settling basins removably attached to the traps, a settling basin removably attached to the vertex of the inverted conical base of the filtering chamber, perforated disks within the cylindrical portion of the filtering chamber, suitable filtering medium disposed between the disks, means for compressing the filtering medium between the disks, a chamber above the disks for the reception of the filtered product and means for withdrawing said product from the chamber.

4. In an apparatus of the class described, a receiving tank, discharging by gravity and vacuum feed, a conducting pipe, a filtering chamber below the receiving tank, traps attached to the conducting pipe, settling basins removably attached to each trap, a faucet between each trap and its settling basin, a settling basin attached to the filtering chamber, means for connecting the conducting pipe with the base of the filtering chamber, means for receiving and conducting the liquid in process of filtration through proper filtering material within the filtering chamber, and means for the withdrawal of said product from the upper part of said chamber.

5. In an apparatus of the class described, a cylindrical filtering chamber, a conducting pipe outside of said chamber having its inlet above said chamber, a series of traps removably connected to the conducting pipe, a settling basin removably connected to each trap, cocks between the traps and conducting pipe, cocks between the traps and the settling basins, a cover removably attached to each settling basin, oppositely disposed windows in said settling basins, pet cocks in the upper part of each settling basin, means for connecting the conducting part with the lower part of the filtering chamber, a filtering medium within said chamber, perforated disks adapted to suitably compress said filtering medium means of access to the top of the filtering chamber, and for the withdrawal of the filtered product.

In testimony that we claim the foregoing as our own, we have hereunto affixed our signatures in the presence of two witnesses.

LUCIUS R. CLARK.
DWIGHT G. KREUL.

Witnesses:
J. A. HANLEY,
E. L. GILBERT.